May 23, 1939.                    J. F. CRAIG                       2,159,781
                          COMPRESSOR CONTROL SWITCH
                    Filed Sept. 4, 1937          2 Sheets—Sheet 1

INVENTOR
JOHN F. CRAIG
BY Wm. M. Cady
ATTORNEY

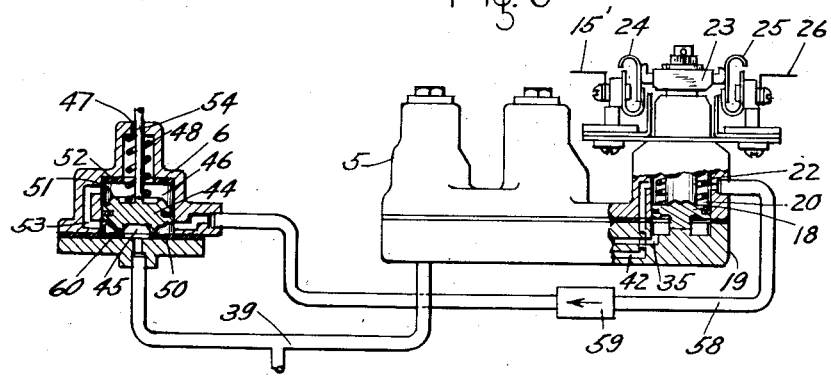

Patented May 23, 1939

2,159,781

UNITED STATES PATENT OFFICE 2,159,781

COMPRESSOR CONTROL SWITCH

John F. Craig, Upper Montclair, N. J., assignor to The Westinghouse Air Brake Company, Wilmerding, Pa., a corporation of Pennsylvania Application September 4, 1937, Serial No. 162,555

20 Claims. (Cl. 172—179)

This invention relates to fluid compressing apparatus such as employed on trolley buses, traction cars and the like for supplying fluid under pressure for controlling the brakes thereon.

On vehicles equipped with a fluid compressor, a governor device is provided which is adapted, when the pressure in the main or storage reservoir is reduced to a predetermined degree, to start the compressor. After the compressor is thus started it continues to operate until the pressure of fluid in the main reservoir is increased to a predetermined degree, at which time the governor operates to stop the compressor.

It is undesirable to have a fluid compressor operate on a vehicle while the vehicle is standing, since the noise of operation is apt to be annoying and disagreeable. Further, while a vehicle is standing the pressure of fluid in the main reservoir, which limits the degree with which the brakes may be applied, may be permitted to reduce, due to leakage or the like, to a much lower degree than permitted by the usual governor device while the vehicle is running, since only a relatively low braking pressure is required to hold the vehicle stopped.

The principal object of the invention is, therefore, to provide improved apparatus for preventing a fluid compressor from operating while a vehicle is standing, unless the main reservoir pressure becomes reduced to a predetermined, lower than usual degree, in which occasional instance the compressor will be automatically caused to operate to replenish the fluid in the main reservoir.

Other objects and advantages will be apparent from the following more detailed description of the invention.

Figure 1:
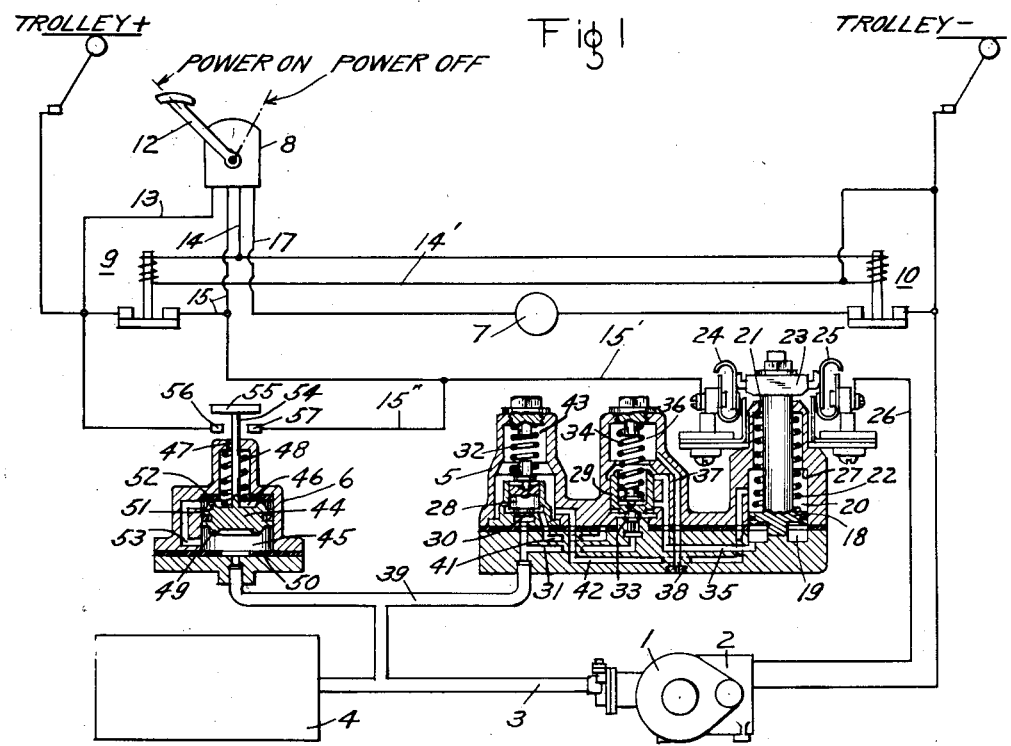
Figure 2:
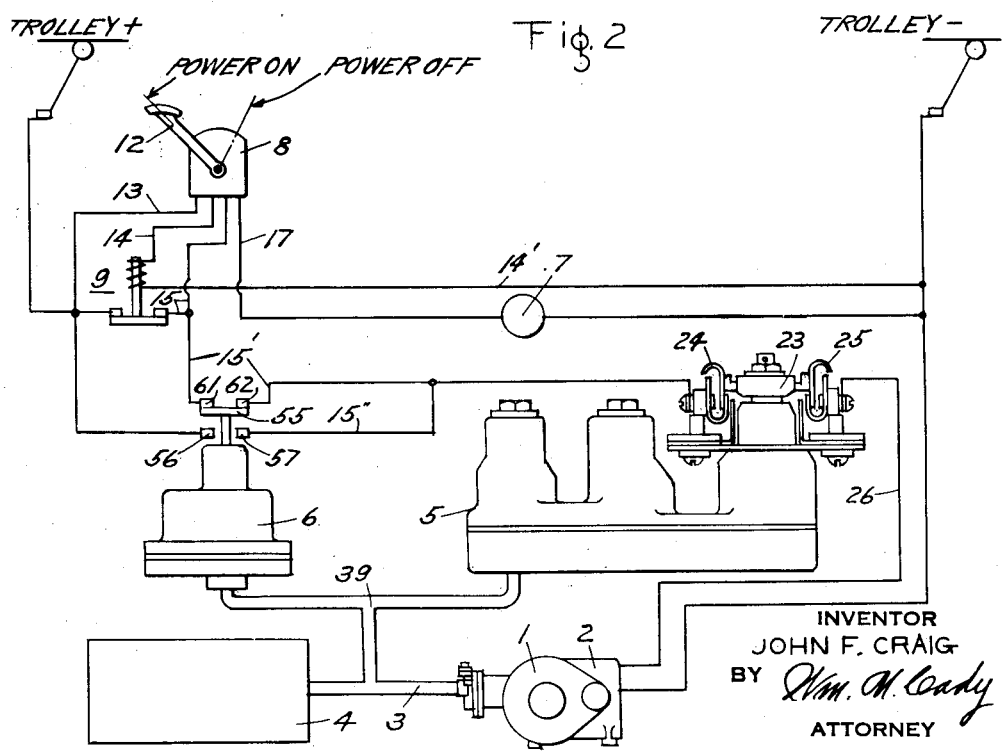

In the accompanying drawings; Fig. 1 is a diagrammatic view of a compressor control apparatus embodying one form of the invention; Fig. 2 is a view similar to Fig. 1 illustrating another embodiment of the invention; Fig. 3 is a view of a portion of the apparatus shown in Figs. 1 and 2 and illustrating a modification thereof; and Fig. 4 is a view similar to Figs. 1 and 2 and illustrating still another embodiment of the invention.

As shown in Fig. 1 of the drawings, the compressor control apparatus comprises a fluid compressor 1 adapted to be driven by an electric motor 2 to compress fluid through a pipe 3 into a main or storage reservoir 4, a normal or high pressure governor device 5, and an additional, low pressure governor device 6. This apparatus is associated with the usual control apparatus for a trolley bus of the type provided with two trolleys, a trolley + and a ground trolley or trolley —, a propulsion motor 7 for driving the vehicle, a manually controlled power controller 8 having a power-on position and a power-off position for controlling said motor, and two circuit breakers 9 and 10 adapted to interrupt both sides of the circuit through said propulsion motor when the power controller 8 is in power-off position, while the vehicle is stopped.

The power controller 8 employed in the drawings for the purpose of illustration, is of the foot controlled type having a pedal 12 which is adapted to be moved to either a power-on position or a power-off position.

In the power-on position of the controller pedal 12, the controller 8 is adapted to connect a wire 13, which is connected to trolley +, to a wire 14 leading to one terminal of the circuit breakers 9 and 10, the other terminal of which is connected to a common wire 14' leading to trolley —, so that in said power-on position both of said circuit breakers are energized. In the power-off position of the controller 8, which is employed when a vehicle is stopped, the circuit through wires 13 and 14 is adapted to be opened so that the circuit breakers 9 and 10 are both deenergized.

The circuit breaker 9 when energized supplies electric current from trolley + to a wire 15 leading to the controller 8 which is adapted in the power-on position to supply current from said wire to wire 17 leading to one terminal of the propulsion motor 7, the other terminal of which is connected to ground or trolley — through the energized circuit breaker 10, so that with current supplied to wire 17, the propulsion motor 7 will be caused to operate to propel the vehicle. Since both circuit breakers 9 and 10 are deenergized in the power-off position of the controller 8 it will be evident that when a vehicle is standing both sides of the propulsion motor circuit are open.

Power controllers of the type above briefly described are intricate in construction and well known, and since the particular details of construction are in no way pertinent to the invention, a further and more detailed description of the controller is not believed to be essential to a comprehensive understanding of the invention.

The high pressure governor device 5, which is normally employed for controlling the operation of the fluid compressor 1, may be of any well known type adapted to so control the operation of the fluid compressor 1 as to maintain the pressure of fluid in the storage reservoir 4 between any desired predetermined limits, such as between seventy-five and eighty-five pounds.

The governor device 5 shown in the drawings for the purpose of illustration is similar to that disclosed in Patent No. 1,615,365 issued to Clyde C. Farmer on January 25, 1927, and comprises a casing containing a piston 18 having at one side a pressure actuating chamber 19 and at the opposite side a chamber 20 which is open to the atmosphere through a restricted port 21. A spring 22 in chamber 20 acts on the piston 18 to urge it to the cut-in position shown in the drawings.

The piston 18 is provided for operating a movable contact 23 adapted in one position of said piston to connect or bridge two fixed, flexible contacts 24 and 25 secured to the governor casing, the contact 24 being connected through a wire 15' to wire 15, and the contact 25 being connected to a wire 26 leading to one terminal of the compressor motor 2, the other terminal of which is at all times connected to the ground trolley —. The contact 23 is movable out of engagement with the contacts 24 and 25 on upward movement of piston 18 into engagement with a shoulder 27 formed in the casing.

The operation of the switch piston 18 is adapted to be controlled by a cut-out valve piston 28 and a cut-in valve piston 29. The cut-out valve piston 28 has at one end a valve 30 of smaller diameter than said piston and subject at all times to the pressure of fluid in a passage 31 which is connected through pipes 39 and 3 to the main reservoir 4. An adjustable spring 32 contained in a chamber 43 acts on the opposite face of the cut-out valve piston 28. The cut-in valve piston 29 has at one end a valve 33 of smaller area than valve 30 and also subject at all times to the main reservoir pressure in passage 31. An adjustable spring 34 contained in a chamber 36 acts on the opposite face of the cut-in valve piston 29.

The cut-out valve piston 28 and cut-in valve piston 29 are shown in the drawing in the positions which they assume when the pressure of fluid in main reservoir 4 is below the degree called for by the adjustment of the cut-out regulating spring 32 and in this position both valves 30 and 33 are seated and the switch piston chamber 19 is vented to the atmosphere through a passage 35, past the upper, unseated end of the cut-in valve piston 29, through chamber 36 and from thence by way of a passage 37 leading to a choke 38 which opens to the atmosphere. The spring 22 is therefore permitted to urge the switch piston 18 and thereby the contact 23 to the position shown in the drawing in which the current supply wire 15' is connected to the compressor motor supply wire 26. If the power controller 8 is in a power-on position and the circuit breaker 9 therefore energized and supplying current from trolley + to wire 15, this current is transmitted through wire 15', the contacts 24, 23, and 25 of the governor device to wire 26 leading to the compressor motor 2 and from thence to the trolley —, thereby causing the compressor 1 to operate to supply fluid to the main reservoir 4.

As the pressure of fluid in the main reservoir 4 is increased by operation of the compressor 1, this pressure is transmitted through the pipes 3 and 39 and passage 31 in the governor device to the lower seated areas of the cut-out valve 30 and cut-in valve 33. When the pressure of fluid is thus increased on the seated area of the cut-out valve 30 to a sufficient degree to overcome the opposing pressure of the control spring 32, said valve is moved away from its seat and exposes the full area of the piston 28 to main reservoir pressure, whereupon said piston promptly moves sufficiently to allow rapid flow of fluid from passage 31 to a passage 41 leading to the face of the cut-in valve piston 29 outside of the valve 33. The main reservoir pressure thus applied to the face of the cut-in valve piston 29 plus the action of said pressure on the valve 33 promptly overcomes the opposing pressure of the control spring 34 and shifts the piston 29 upwardly, seating the upper end thereof against a seat in the casing.

In this upper position of the cut-in valve piston 29 passage 35 is opened to the space below said piston so that fluid at main reservoir pressure is permitted to flow from passage 41 to passage 35 and from thence to the switch piston chamber 19. The fluid pressure thus supplied to chamber 19 and acting on the piston 18 overcomes the opposing pressure of spring 22 on said piston and moves said piston to its upper position defined by engagement with the shoulder 27 in the casing. This movement of piston 18 moves the contact 23 out of engagement with the contacts 24 and 25 and thereby opens the circuit to the compressor motor 2 which causes the compressor 1 to cease operating. From this description of the cut-out operation of the governor device 5 it will be noted that the maximum pressure obtainable in the reservoir 4 by operation of the compressor 1 is determined or limited by the area of the cut-out valve 30 when seated and the adjusted pressure of the control spring 32.

When the switch piston 18 moves to its upper position it moves over a passage 42 opening said passage to chamber 19 so that fluid under pressure is permitted to flow from chamber 19 through passage 42 to chamber 43 above the cut-out valve piston 28. The fluid pressures on the opposite faces of the cut-out valve piston 28 are thereby equalized which permits the control spring 32 to move said piston downwardly until the valve 30 seats, where it remains until called upon again to stop the operation of the compressor 1, as above described.

In this cut-out position of the normal governor device 5 it will be noted that the cut-in valve piston 29 is subject to the opposing pressure of main reservoir fluid acting on the lower face and the control spring 34 acting on the upper face, since the chamber 36 at the upper face of said valve piston is open to the atmosphere through passage 37 and choke 38.

Now when the pressure of fluid in the main reservoir 4 becomes reduced sufficiently, due to being used for braking purposes or otherwise, for the spring 34 to overcome the opposing fluid pressure acting on the piston 29, said spring moves the piston 29 out of engagement with the seat at its upper end and thereby opens passage 35 to the chamber 36. Through this communication fluid under pressure flows from the switch piston chamber 19 to chamber 36 and from thence to the atmosphere through passage 37 and choke 38. The choke 38 offers such a restriction to this flow, however, that a fluid pressure is built up in chamber 36 on the upper face of the cut-in valve piston 29 which acts in conjunction with the spring 34 to promptly overcome the opposing fluid pressure acting on the lower face of said piston and move said piston to its lower position seating the valve 33, thus preventing further supply of fluid at main reservoir pressure from passage 31 to passage 41. The fluid pressure in passage 41 is then dissipated by leakage past the cut-in valve piston 29 to passage 35 from whence it is vented with the fluid pressure from the switch piston chamber 19 to the atmosphere through choke 38.

When the pressure of fluid in piston chamber 19 is thus reduced sufficiently, the spring 22 causes said piston to return to its lower position and thereby move the contact 23 into engagement with the contacts 24 and 25 for causing the compressor 1 to again operate to build up the pressure of fluid in the main reservoir 4 to the degree at which the cut-out valve piston 28 operates as above described.

As the switch piston 18 is thus returned to its lower position the passage 42 is opened to the space above said piston so that the fluid pressure in chamber 43 above the cut-out valve piston 28 is vented to spring chamber 20 where it builds up a slight fluid pressure which acts to aid spring 22 to cause the prompt movement of the switch piston to its circuit closing position, as above described. The fluid pressure in chambers 43 and 20 is then dissipated to the atmosphere through the restricted port 21.

It will be noted from the above description that the normal pressure governor device 5 is able to control the operation of the fluid compressor 1, as above described, only when the circuit breaker 9 is closed to supply current to wire 15. In other words, when the power controller is in the power-off position and the circuit breaker 9 therefore deenergized, as when a vehicle is standing, the supply of electric current to wire 15 by way of said circuit breaker is cut off, so that the operation of the pressure governor 5 cannot cause operation of the compressor 1 as will be evident.

The pressure needed in the main reservoir 4 to hold a vehicle stopped is considerably less than that called for by operation of the normal governor device 5, so that in case there is leakage from the main reservoir or other parts of the brake system on the vehicle which would tend to reduce the reservoir pressure, it is permissible to permit this pressure to reduce to a considerably lower degree than that called for by the normal governor device without jeopardizing the safety of the vehicle when stopped. In view of this, the normal governor device is rendered ineffective to start the compressor 1 when the power controller 8 is in power-off position and the circuit breaker 9 is open when a vehicle is stopped, as above described.

In order, however, to avoid the main reservoir pressure becoming reduced to a dangerously low degree, while the vehicle is stopped, the low pressure governor device 6 is provided for effecting operation of the compressor 1 to replenish the fluid pressure in the main reservoir before the reservoir pressure is reduced to an excessively low degree.

The low pressure governor device 6 may be caused to cut in and start the compressor 1 when the main reservoir pressure is reduced to for instance sixty-five pounds, which is more than adequate for the purpose of safety, but which may be, for instance, ten pounds lower than the cut-in adjustment of the normal governor device 5. By this arrangement the pressure of fluid in the main reservoir will be permitted to reduce to a lower than usual degree before starting the compressor, with the desirable result that under usual leakage conditions the compressor will seldom if ever be started while the car is stopped, but nevertheless, will be caused to operate in the remote case of need, to insure an adequate fluid pressure being maintained in the main reservoir 4 for safe holding of the vehicle.

The normal pressure governor 5 is, as will be evident from the drawings and the above description, of relatively complicated design embodying not only the circuit controlling switch mechanism but also valve means which are necessary to insure the proper, prompt operation of the switch mechanism at the desired pressures in the main reservoir 4. According to the invention the low pressure governor 6 is a relatively simple, inexpensive device, not designed to operate as dependably as the normal governor device 5 but its operation will be sufficiently dependable to insure an adequate pressure being maintained in the reservoir 4 to provide the proper degree of protection to the braking of the vehicle under the conditions required.

As shown in the drawings, the low pressure governor device 6 comprises a casing containing a switch piston 44 having at one side a chamber 45 connected to pipe 39 leading to the main reservoir 4 and having at the opposite side a chamber 46 open to the atmosphere through a restricted port 47 and containing a spring 48 acting on said piston urging it to its lowermost position.

The piston 44 has on its lower face an annular sealing bead 49 adapted in the lowermost position of said piston to engage and seal against a gasket 50, and said piston has on the upper face an annular sealing bead 51 of slightly greater diameter than the bead 49 and adapted in the upper position of said piston to engage and seal against a gasket 52.

The area of the piston within the sealing bead 49 is so proportioned to the pressure of spring 48 as to require a predetermined fluid pressure, such as 80 pounds, in reservoir 4 and consequently in chamber 45 acting on said piston within said bead to overcome the pressure of spring 48 and move said piston out of its lowermost position. In the upper position of the piston the pressure of fluid in chamber 45 is effective over a larger area, as defined by that within the sealing bead 52 so that in order for the spring 48 to move the piston 44 out of its upper position the pressure of fluid in chamber 45 has to be reduced to a predetermined degree below the pressure required for moving the piston out of its lowermost position, or to a pressure such as 65 pounds. A by-pass groove 53 is provided in the casing for equalizing the fluid pressure at the unseated side of the piston with that at the opposite side of the piston outside of the respective sealing bead.

The piston 44 is provided with a rod 54 carrying at its outer end a suitably insulated, movable contact element 55 adapted in the lower position of said piston to bridge two fixed contacts 56 and 57 and in the upper position of said piston to open the circuit through said contacts. The contact 56 is connected to the trolley + while the contact 57 is connected to a wire 15″ which leads to wire 15′ connected to the normal governor device 5.

In operation, whenever the car controller 8 is in the power-on position and the circuit breaker 9 is closed, the normal governor device 5 operates to control the operation of the compressor 1, as hereinbefore described. The normal governor device 5 may be adjusted to maintain the pressure of fluid in reservoir 4 within the limits of seventy-five and eighty-five pounds, while the low pressure governor device 6 may be designed to operate to maintain the reservoir pressure within lower limits, such as between sixty-five and eighty pounds. It will be therefore evident, that whenever the normal governor device 5 is conditioned to control the compressor 1 with the controller 8 in power-on position, the pressure in the reservoir 4 will never reduce sufficiently to permit the low pressure governor 6 to move to its lower position. However, when the power controller 8 is moved to the power-off position and the circuit breaker 9 consequently operates to cut off the supply of current from trolley + to wire 15', the cut-in operation of the normal governor device 5 cannot cause the compressor 1 to start operating, as will be evident.

Under such circumstances, the pressure of fluid in the main reservoir 4 will continue to reduce after the cut-in operation of the normal governor device 5 in case there is leakage of fluid under pressure from the brake system, until said pressure acting in piston chamber 45 of the low pressure governor device 6 becomes reduced sufficiently for spring 48 to move the piston 44 out of engagement with the gasket 52. Upon this movement of piston 44 fluid under pressure will suddenly flow from chamber 45 through the by-pass port 53 to chamber 46 and build up a fluid pressure therein against the restricted vent port 47 to act with spring 48 and cause prompt movement of said piston to its lowermost position, into engagement with the gasket 50. This movement of the piston 44 moves the contact 55 into engagement with the contacts 56 and 57 whereupon current from trolley + is supplied to wire 15" and from thence through wire 15' and the closed contacts of the normal pressure governor device 5 to the compressor motor 2, so as to cause the compressor 1 to operate to replenish the fluid pressure in reservoir 4.

In this lower position of the low pressure switch piston 44 the area of said piston outside of the sealing bead 49 is open to the atmosphere through the by-pass port 53, spring chamber 46 and the restricted vent port 47 so that only the area of the piston within the bead 49 is subject to the increase in pressure in reservoir 4.

When, due to operation of the compressor 1, the pressure of fluid in reservoir 4 acting within the sealing bead 49 is increased to a degree sufficient to overcome the pressure of spring 48, such as for example eighty-pounds, said piston is moved out of engagement with the gasket 50. This exposes the full area of the lower face of said piston to main reservoir pressure which causes said piston to promptly move to its upper position into sealing engagement with the gasket 52, this movement shifting the contact 55 out of engagement with the contacts 56 and 57, thereby opening the circuit to the compressor motor 2 and stopping the compressor 1.

In case, while the car is standing, the pressure of fluid in reservoir 4 again becomes reduced to the cut-in pressure adjustment of the low pressure governor device 6, said governor device will again operate to effect operation of the compressor 1 to increase the pressure of fluid in the reservoir 4 to the cut-out adjustment of said device, so as to thereby maintain the pressure of fluid in said reservoir at a safe degree while the car is standing and the normal governor device 5 is cut out of operation.

It will be noted that the low pressure governor device controls the fluid compressor 1 through the contacts of the normal pressure governor device 5. This is desirable in that, due to the relatively simple structure of the low pressure governor device 6, there is a remote possibility that due to leakage in the governor device, high friction in the parts thereof or for other reasons, said governor device may, at some time or other, fail to respond to the gradual increase in pressure in reservoir 4 and stop the compressor, as desired. By connecting the two governor devices in series, however, any failure of the low pressure governor device to stop the compressor 1 will not be material, since as soon as the pressure in the reservoir 4 is increased to the cut-out adjustment of the normal governor device 5, which is positive in its operation, the normal governor device will operate to open the circuit to the compressor motor 2 and thereby stop the compressor 1. In case of such remote failure of the low pressure governor device it will be evident that unless the cause of said failure is remedied, the normal governor device 5 will then possibly continue to control the operation of the compressor 1 in the usual manner, while the car is standing.

So long as the low pressure governor 6 delays, as desired, the starting of the compressor 1 while the car is standing, it is not harmful to permit the reservoir pressure to be built up to the cut-out adjustment of the normal governor device 5, but it is undesirable thereafter, so long as the car is at a standstill, to have the starting of the compressor 1 under the control of the normal governor device as just described.

In order to ensure that the low pressure governor device 6 will control the starting of the compressor 1 even subsequent to its failure to stop said compressor, the apparatus shown in Fig. 1 may be modified by providing a pipe 58 connecting the switch piston chamber 18 in the cut-out position of the normal governor device 5 to the seated area of the low pressure switch piston 44 otuside of the seat rib 49, as shown in Fig. 3 of the drawings. Through this pipe fluid under pressure is adapted to be supplied to the area of the low pressure switch piston outside of seat rib 49 upon cut-out operation of the normal governor device 5, and this additional pressure suddenly applied to the low pressure switch piston 44 will act to break said piston loose and effect sudden movement thereof to the cut-out position. In this manner the low pressure governor device 6 will be conditioned by the cut-out operation of the normal governor device 5 to control the starting of the compressor 1, in case, while the car is still standing, the pressure in reservoir 4 should again become reduced to the cut-in adjustment of the low pressure governor device.

A check valve 59 is provided in the pipe 58 to prevent flow of fluid from the low pressure governor device 6 to spring chamber 20 in the normal governor device 5 and from thence to the atmosphere through the leakage port 21 when said low pressure governor device operates as intended to stop the compressor.

Since after the compressor is started by the low pressure governor device 6 it is not harmful to permit the compressor to operate until stopped by the normal governor device 5, the construction of the low pressure governor piston 44 may also be modified, if desired, so that the low pressure governor device will never operate to stop the compressor but will always remain in the circuit closing position until the compressor is stopped by operation of the normal governor device 5.

This modification of the low pressure governor device 6, as shown in Fig. 3, consists in the provision of a seat rib 60 on the lower face of piston 44, which is of smaller diameter than the seat rib 49 shown in Fig. 1, the area of the piston enclosed by the seat rib 60 being so related to the pressure of the spring 48 as to require in the lower position of said piston a greater increase in main reservoir pressure to move the piston out of the circuit closing position than is required to effect cut-out operation of the high pressure governor device 5.

Thus the low pressure governor device 6 will remain in the circuit closing position until after the operation of the high pressure governor device 5 to stop the compressor and will then be moved to the circuit opening position by fluid supplied through pipe 58, so as to be effective to control the starting of the compressor in case such again becomes necessary while the car is stopped. By this modification, the contacts 55, 56 and 57 of the low pressure governor device never break the compressor circuit and are therefore not subject to burning due to arcing. These contacts may therefore be made as simple as possible and will last for an indefinite period.

It will be noted that when current is supplied to wire 15″ upon operation of the low pressure governor device 6 to start the compressor this current is supplied through wires 15′ and 15 to the power controller 8 as well as to the compressor motor 2. This construction is permissible where the circuit breaker 10 is employed to open the ground connection of the propulsion motor 7, but in certain installations no circuit breaker is employed in this ground connection, the propulsion motor being permanently connected to ground. In installations where no circuit breaker 10 is employed, if certain elements (not shown) in the controller should remain in a position connecting wire 15 to wire 17 upon movement of said controller to power-off position, current supplied by the low pressure governor device 6 to said controller would be liable to be supplied to the propulsion motor 7 and thus tend to start the car or provide other interference with the control of said motor.

In order to avoid any possible interference in the control of the propulsion motor 7 when no circuit breaker 10 is employed in the ground connection thereof, the low pressure governor device 6 may be arranged to open the circuit through wire 15′ to the controller 8 before it closes the circuit from trolley + to wire 15″ for supplying current to the compressor motor 2. This modification as shown in Fig. 2, consists in controlling the circuit through wire 15′ on the circuit breaker side of its connection to wire 15″ through two fixed contacts 61 and 62 and the movable contact 55. The contact 55 is adapted to engage the fixed contacts 61 and 62 when the low pressure governor device 6 is in the cut-out position so that the normal governor device 5 may control the operation of the compressor in the usual manner when the power controller is in the power-on position. However, when the low pressure governor device operates to start the compressor 1 with the power controller in power-off position, the contact 55 disconnects contacts 60 and 61 before connecting the contacts 56 and 57, thereby preventing current supplied by the low pressure governor device 6 to wire 15″ for effecting operation of the compressor 1 being supplied to the power controller 8.

If desired the low pressure governor device 6 may be constructed as an integral part of the normal pressure governor device 5 in the manner shown in Fig. 4 of the drawings. In this construction the low pressure governor piston 44 is provided with a seat rib 60 described in connection with the construction shown in Fig. 3 of the drawings, and the casing of the device is provided with a passage 58a and check valve 59a corresponding to the pipe 58 and check valve 59 respectively, of the structure shown in Fig. 3, thereby providing an integral structure in which the low pressure portion of the device controls only the starting of the compressor while a car is standing, while the high pressure portion of the device controls the stopping of the compressor in the manner hereinbefore described in connection with the apparatus shown in Fig. 3. Otherwise the apparatus shown in Fig. 4 is substantially the same and operates in the same manner as that shown in Fig. 2 of the drawings, as hereinbefore described.

From the above description, it will be evident that disagreeable or annoying disturbance of compressor operation while a vehicle is standing, may be reduced to a minimum merely by the use of a relatively simple, inexpensive fluid pressure controlled switch device arranged to delay the starting of the compressor while the vehicle is standing. This switch device is so associated with and protected by the usual pressure governor device however that in case of its failure to stop the compressor as intended, the dependable operation of the relatively more complicated and expensive normal governor device will prevent excessive pressure being developed in the main reservoir, which otherwise might result in damage.

While several embodiments of the invention have been described in detail, it is not the intention to limit the scope to these embodiments or otherwise than by the terms of the appended claims.

Having now described my invention, what I claim as new and desire to secure by Letters Patent, is:

1. In combination, a source of electric current, a vehicle propulsion motor adapted to be operated by current from said source, a ground circuit breaker in the ground connection of said motor, a power circuit breaker in the connection between said source and motor, a power controller element having a power-on position for effecting closure of both of said circuit breakers and a power-off position for effecting opening of said circuit breakers, a fluid compressor, an electric motor for said compressor, a high pressure governor device for said compressor motor which controls a circuit from the compressor motor to the circuit connecting the power circuit breaker with said propulsion motor, and a low pressure governor device controlling a circuit from said source to said compressor motor which shunts the power circuit breaker.

2. In combination, a vehicle propulsion motor, a circuit breaker for controlling the supply of electric current to said motor, a power controller element having a power-on position for effecting operation of said circuit breaker to supply current to a conductor for supplying said motor for effecting operation thereof, a fluid compressor, an electric motor for operating said compressor, a high pressure compressor governor device controlling a circuit connecting said conductor to said compressor motor, and a low pressure compressor governor device controlling a connection between said compressor motor and the power supply side of said circuit breaker and operative upon closing said connection to open the connection between said high pressure governor device and said conductor.

3. The combination with a vehicle propulsion motor, a fluid compressor, an electric motor for said compressor, a power circuit breaker operative upon energization to supply current for effecting the operation of both of said motors, a high pressure governor device in the connection between said circuit breaker and compressor motor for controlling the supply of current to said compressor motor, a power controller element having a power-on position for effecting energization of said circuit breaker and a power-off position for effecting deenergization of said circuit breaker, and a low pressure governor device for supplying current to said compressor motor independently of said circuit breaker.

4. The combination with a vehicle propulsion motor, a fluid compressor, an electric motor for said compressor, a power circuit breaker operative upon energization to supply current for effecting the operation of both of said motors, a high pressure governor device in the connection between said circuit breaker and compressor motor for controlling the supply of current to said compressor motor, a power controller element having a power-on position for effecting energization of said circuit breaker and a power-off position for effecting deenergization of said circuit breaker, and a low pressure governor device for supplying current to said compressor motor independently of said circuit breaker, said low pressure governor device also controlling the connection between said propulsion motor and circuit breaker and being operative to open said connection upon supplying current to said compressor motor.

5. The combination with a vehicle propulsion motor, a fluid compressor, an electric motor for said compressor, a power circuit breaker operative upon energization to supply current for effecting the operation of both of said motors, a high pressure governor device in the connection between said circuit breaker and compressor motor for controlling the supply of current to said compressor motor, a power controller element having a power-on position for effecting energization of said circuit breaker and a power-off position for effecting deenergization of said circuit breaker, a circuit breaker in the ground connection of said propulsion motor connected to operate in unison with said power circuit breaker and operative upon energization to open said ground connection, and a low pressure governor device for controlling a supply of current to said compressor motor independently of said circuit breakers.

6. The combination with a vehicle carried fluid compressor and an electric motor for said compressor, a governor device operative to open and close a power circuit through said motor, another governor device cooperative with the first named governor device to close another power circuit through said motor and operative by the first named governor device to open said circuit, and a power control element having one position for conditioning one of said governor devices to control the closing of the motor power circuit and another position for conditioning the other governor device to control the closing of the motor power circuit.

7. The combination with a vehicle carried fluid compressor and an electric motor for said compressor, a governor device operative to open and close a power circuit through said motor, a power control element having various control positions, means operative in one position of said element for conditioning said governor device to control the closing of said circuit and in another position of said element to render said governor device ineffective to control the closing of said circuit, and another compressor governor device operative to supply current to said motor when the first named governor device is ineffective and operative by the first named governor device to cut off such supply of current to said motor.

8. The combination with a vehicle carried fluid compressor and an electric motor for said compressor, of two compressor governor devices each adapted to effect the opening and closing of the power circuit through said motor, a power controller element, means controlled by said element for rendering one of said governor devices either effective or ineffective to control the opening and closing of said circuit, the other governor device being operative to control the closing of said circuit when the one governor device is ineffective to control the closing of said circuit, said one governor device being operative upon opening said circuit to effect movement of the other governor device to its circuit opening position.

9. The combination with a vehicle carried fluid compressor, and an electric motor for operating said compressor, of two governor devices for said compressor each adapted to control the opening and closing of a power circuit through said motor, a power control element, and means controlled by said power control element for rendering either one or the other of said governor devices effective to control said motor power circuit, one of said governor devices being operative to effect operation of the other governor device to open the motor power circuit controlled thereby.

10. The combination with a vehicle carried fluid compressor, and an electric motor for operating said compressor, of a high pressure governor device for said compressor, a low pressure governor device for said compressor, each of said governor devices being operative to control the opening and closing of a power circuit through said motor, a power control element operative to select the governor device for controlling the compressor motor, and means included in said high pressure governor device operative upon failure of said low pressure governor device to open the motor circuit, to effect operation thereof to open such circuit.

11. The combination with a vehicle carried fluid compressor and an electric motor for said compressor, a high pressure governor device having a closed position for supplying current to said motor for effecting operation thereof and having an open position for cutting off the supply of current to said motor, a low pressure governor device having closed and open positions for respectively supplying current to said motor and for cutting off such supply, said high pressure governor device being operative upon movement to the open position to effect movement of said low pressure governor device to open position, a source of current connected directly to said low pressure governor device for supply to said motor, and a power controller having one position for supplying current from said source to said high pressure governor device and another position for cutting off the supply of current to said high pressure governor device.

12. The combination with a vehicle carried fluid compressor, and an electric motor for said compressor, of a high pressure governor device controlled by the pressure of fluid compressed by said compressor for controlling the opening and closing of a power circuit through said motor, a power controller having a power-on position and a power-off position and operative in power-off position to render said governor device ineffective to close said power circuit, a low pressure governor device controlled by the pressure of fluid compressed by said compressor for controlling a power circuit through said motor independently of said power controller, said high pressure governor device being operative to open the motor circuit controlled by the low pressure governor device upon failure of said low pressure governor device to open such circuit and to also effect movement of said low pressure governor device to its circuit opening position.

13. The combination with a vehicle carried fluid compressor, and an electric motor for said compressor, of a high pressure governor device controlled by the pressure of fluid compressed by said compressor for controlling the opening and closing of a power circuit through said motor, a power controller having a power-on position and a power-off position and operative in power-off position to render said governor device ineffective to close said power circuit, a low pressure governor device controlled by the pressure of fluid compressed by said compressor and operative to close a power circuit through said motor independently of said controller, said high pressure governor device being operative to open the circuit closed by said low pressure governor device and to effect movement thereof to its circuit opening position.

14. The combination with a vehicle carried fluid compressor, and an electric motor for operating said compressor, of a low pressure governor device for opening and closing a power circuit through said motor, a high pressure governor device for opening and closing said circuit and for supplying fluid under pressure to said low pressure governor device for effecting movement thereof to a position for opening said circuit, a power controller, and means controlled by said power controller operative at one time to render said high pressure governor device ineffective to control said circuit and operative at another time to render said low pressure governor device ineffective to control said circuit.

15. The combination with a vehicle carried fluid compressor, and an electric motor for operating said compressor, of a low pressure governor switch for controlling the opening and closing of a power circuit through said motor, a piston subject at all times to the pressure of fluid compressed by said compressor for controlling said switch, a high pressure governor switch for controlling the opening and closing of said circuit, a piston controlled by fluid under pressure for controlling said high pressure governor switch, valve means subject at all times to and operative in accordance with variations in the pressure of fluid compressed by said compressor for controlling said high pressure governor switch piston, and a power controller for selectively rendering either said low pressure governor switch or said high pressure governor switch ineffective to control the compressor motor circuit.

16. The combination with a vehicle carried fluid compressor and an electric motor for operating said compressor, of a high pressure governor device operative when the pressure of fluid compressed by said compressor is reduced by a chosen degree to supply current to said motor and when the pressure of fluid compressed by said compressor is built up to a predetermined degree to open the compressor motor circuit, a power controller having a position for rendering said governor ineffective to supply current to said motor, a low pressure governor device operative to supply current to said motor when the pressure of fluid compressed by said compressor becomes reduced to a degree lower than that at which said high pressure governor device operates to supply current to said motor, said high pressure governor device being arranged to control the supply of current from said low pressure governor device to said motor and being operative when the pressure of fluid compressed is built up to said predetermined degree to cut off such supply and to effect operation of said low pressure governor device to open the motor supply circuit controlled thereby.

17. The combination with a vehicle carried fluid compressor and a motor for operating said compressor, a high pressure governor switch operative when the pressure of fluid compressed by said compressor reduces to a predetermined degree to supply current to said motor for effecting operation of said compressor, a low pressure governor switch operative when the pressure of fluid compressed by said compressor reduces to a lower degree to supply current to said motor for effecting operation of said compressor, and valve means operative upon a predetermined increase in the pressure of fluid compressed by said compressor for supplying fluid under pressure to effect concurrent movement of both of said switches to positions for cutting off the supply of current to said motor.

18. The combination with a vehicle carried fluid compressor and a motor for operating said compressor, a high pressure governor switch operative when the pressure of fluid compressed by said compressor reduces to a predetermined degree to supply current to said motor for effecting operation of said compressor, a low pressure governor switch operative when the pressure of fluid compressed by said compressor reduces to a lower degree to supply current to said motor for effecting operation of said compressor, a piston for each of said switches for effecting operation thereof, the low pressure governor switch piston being subject to the pressure of fluid compressed by said compressor, valve means controlled by the pressure of fluid compressed by said compressor for controlling the pressure of fluid on the high pressure governor switch piston and operative upon a predetermined increase in the pressure of fluid compressed by the compressor for supplying fluid under pressure to both pistons for effecting operation of both of said switches to cut off the supply of current to said motor and operative upon a predetermined reduction in the pressure of fluid compressed by said compressor for venting the fluid pressure from the high pressure governor switch piston, and check valve means for preventing reverse flow of fluid through the communication through which fluid is supplied to said low pressure switch piston upon operation of said valve means.

19. The combination with a vehicle carried fluid compressor and a motor for operating said compressor, a high pressure governor switch operative when the pressure of fluid compressed by said compressor reduces to a predetetmined degree to supply current to said motor for effecting operation of said compressor, a low pressure governor switch operative when the pressure of fluid compressed by said compressor reduces to a lower degree to supply current to said motor for effecting operation of said compressor, and valve means operative upon a predetermined increase in the pressure of fluid compressed by said compressor for supplying fluid under pressure to effect concurrent movement of both of said switches to positions for cutting off the supply of current to said motor, said switches being arranged to control in series the supply of all current to said motor.

20. The combination with a vehicle carried fluid compressor and a motor for operating said compressor, a high pressure governor switch operative when the pressure of fluid compressed by said compressor reduces to a predetermined degree to supply current to said motor for effecting operation of said compressor, a low pressure governor switch operative when the pressure of fluid compressed by said compressor reduces to a lower degree to supply current to said motor for effecting operation of said compressor, and valve means operative upon a predetermined increase in the pressure of fluid compressed by said compressor for supplying fluid under pressure to effect movement of both of said switches to positions for cutting off the supply of current to said motor, said high pressure governor switch being arranged to supply current to said motor independently of said low pressure governor switch and to control in series with said low pressure governor switch the supply of current to said motor through said low pressure switch.

JOHN F. CRAIG.